United States Patent [19]

Fuller

[11] 4,077,125

[45] Mar. 7, 1978

[54] AUTOMATIC SAFETY BRAKE FOR CHAIN SAW

[76] Inventor: Henry C. Fuller, 9529 N. Apple Blossom La., Milwaukee, Wis. 53217

[21] Appl. No.: 769,983

[22] Filed: Feb. 18, 1977

[51] Int. Cl.² .......................................... B27G 19/00
[52] U.S. Cl. ............................................... 30/382
[58] Field of Search ................. 30/381, 382, 383, 384, 30/386; 188/166

[56] References Cited

U.S. PATENT DOCUMENTS

| | | | |
|---|---|---|---|
| 3,739,475 | 6/1973 | Moore | 30/382 X |
| 3,810,309 | 5/1974 | Wiklund | 30/382 |

Primary Examiner—Jimmy C. Peters
Attorney, Agent, or Firm—Wheeler, Morsell, House & Fuller

[57] ABSTRACT

A chain saw with a safety brake includes a cutter bar which is pivotally connected to the saw frame. A brake band arranged around the clutch hub of the gear sprocket has one band end connected to the frame and the other band end connected to the pivotal cutter bar. A spring between the saw frame and the cutter bar urges the cutter bar about the pivot to a safety position in which the brake band grips the clutch drum and prevents chain movement. Manual pressure of the cutter bar against the work material overcomes the bias of the spring to pivot the cutter bar to the working position and release the brake band and enable the cutting chain to travel. Release of pressure on the cutter bar as for instance when the bar severs the work material causes the cutter bar to return to the safety position under spring bias, with the brake band engaged with the clutch drum and chain movement stopped. Manual overrides are disclosed to enable chain movement when the cutter bar is not pressed against the work.

10 Claims, 4 Drawing Figures

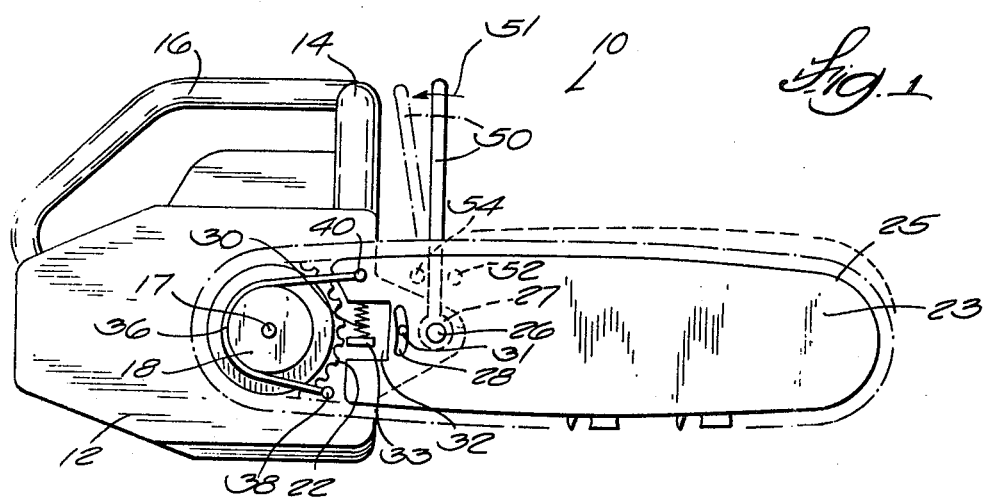
Fig. 1
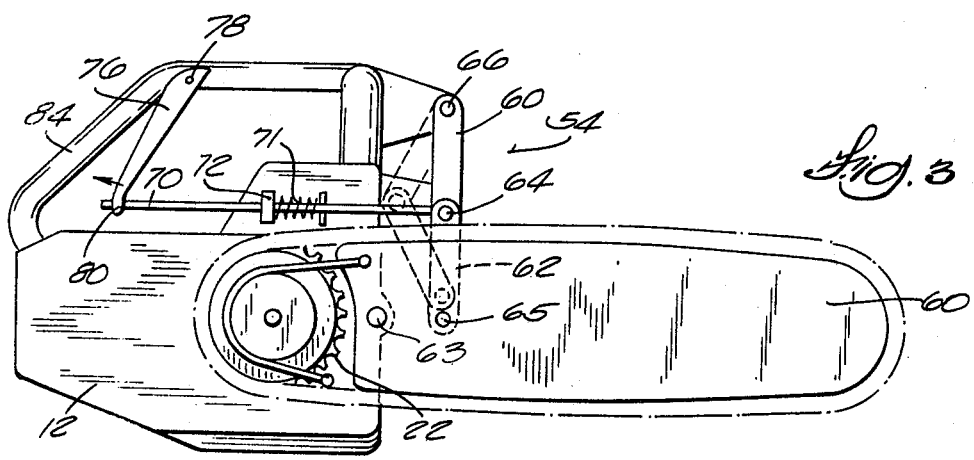
Fig. 3
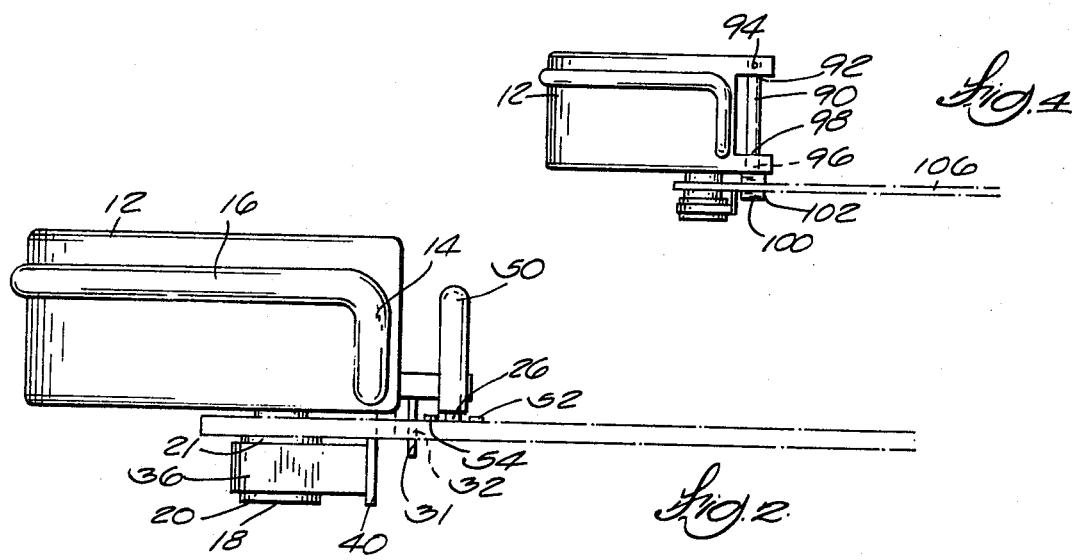
Fig. 4
Fig. 2

4,077,125

AUTOMATIC SAFETY BRAKE FOR CHAIN SAW

BACKGROUND OF INVENTION

Although chain brakes are available on chain saws, the conventional chain brakes require manual actuation of a brake lever to stop chain movement. Thus the safety capability of these brakes depends on manual manipulation by the operator which can't always be accomplished in the time interval available when the necessity for emergency braking occurs.

SUMMARY OF INVENTION

The invention provides an automatic safety brake in which the chain is only driven when the cutter bar is pressed against work material. When the pressure on the cutter bar is released from the work either by accidental throw back of the saw or when the cut is completed, cutting chain movement is rapidly and automatically stopped to prevent injury to the chain saw operator.

The cutter bar is pivotally mounted to the saw frame for movement between a safety position with the chain inoperative and a cutting or operative position with the chain driven. In this regard, a brake band is arranged around the drum of a centrifugal clutch. The chain sprocket is on the clutch hub. A brake band is fixed at one end to the frame and at the other end to the cutter bar. The cutter bar is spring biased about the pivot to the safety position in which the brake band grips the clutch drum to stop the clutch and prevent chain movement. Pressure of the cutter bar against work material to overcome the spring bias and pivot the cutter bar to the operative position releases the grip of the brake band on the clutch drum to enable rotation of the chain sprocket and thus cutting movement of the chain.

A manual override is disclosed to overcome the bias of the cutter bar to the safety position and thus to afford chain saw operation when the cutter bar isn't fully pressed against the work material. The manual override is desirable for instance if the cutter bar is pinched in the kerf and it is necessary to have the cutting chain traveling to back the cutter bar out of the kerf. In addition it is often necessary with a cold engine to have the cutting chain traveling at high speed before engaging the work to prevent stalling of the engine.

It is an object of the invention to provide a chain saw with a safety brake in which the cutting chain is operative when the cutter bar is pressed against work material and in which the cutting chain is quickly and automatically stopped by the brake when the cutter bar is free from the work.

Further objects, advantages, and features of the invention will be apparent from the disclosure.

DESCRIPTION OF THE DRAWINGS

FIG. 1 is a diagrammatic side view of a chain saw embodying the safety brake of the invention.

FIG. 2 is a plan view of the chain saw shown in FIG. 1.

FIG. 3 is a diagrammatic side view of a modified embodiment of the invention.

FIG. 4 is a plan view of a further modified embodiment of the invention.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In FIG. 1, chain saw 10 has a frame 12 with forward handle 14 and rearwardly extending handle 16. The engine output shaft 17 is provided with a conventional centrifugal clutch 18 having a drum 20 and a hub 21 (FIG. 2) which is connected to the shaft 17. The hub is connected to or integrally formed with a chain saw sprocket 22.

A cutter bar 24 carrying a cutting chain 25 is pivotally connected by a headed bolt 26 to the frame 12 to provide displacement of the cutter bar 24 between the safety position shown in full lines in FIG. 1 and the working position shown in broken lines in FIG. 1. The bolt 26 extends through an aperture 27 in the bar 24. Cutter bar displacement between the safety position and working position can be controlled by an arcuate slot 28 in the cutter bar 23 (FIG. 1) and a stop bolt 31 threaded into the frame 12 and having a bolt shank 32 located in the slot 28. The cutter bar 24 is biased to the position shown in full lines in FIG. 1 by biasing means. In the construction shown in FIG. 1 the biasing means is in the form of a spring 30 connected between a ledge 33 on the frame 12 and a notch 32 of the cutter bar 24.

Brake means are provided for stopping movement of the cutting chain 25. In the disclosed construction the brake means includes a brake band 36 which has one end connected by a pin 38 to the frame 12 and the other end connected by a pin 40 to the cutter bar. The brake band 36 is looped around the clutch drum 20. The brake band 36 can be constructed of stainless steel. Frictional gripping of the brake band 36 on the drum 20 causes disengagement of the centrifugal engaging elements (not shown) in the clutch to stop sprocket rotation.

The connections of the band 36 to the cutter bar and frame are arranged so that when the cutter bar is in the full line safety position shown in FIG. 1 the brake band tightly grips the clutch drum to slow the drum and stop sprocket rotation and chain travel. When the cutter bar is pressed against the work to pivot the cutter bar about the pivot to the broken line position and compress the spring 30, the brake band is loose on the clutch drum and permits sprocket rotation and chain travel. Only very slight pivotal movement of the cutter bar is required to release the brake band on the drum.

The chain saw disclosed in FIG. 1 includes a manual override for the safety brake to enable cutting action of the chain saw 10 without the cutter bar being fully pressed against the work to compress the spring and pivot the cutter bar 24. The override is desirable for freeing the chain 25 or cutter bar 24 if it is pinched in the kerf. It also may be necessary to start the chain travel prior to engagement with the wood with a cold engine to prevent stalling of the engine when the work is engaged. In FIG. 1 the manual override comprises a lever 50 which has a bearing portion pivotally supported on the bolt 26. Forward and rear abutments 52, 54 are located on the cutter bar. The lever 50 is easily gripped by the hand of the operator which is holding the forward handle 14. Manual and rearward pressure of the lever 50 in the direction of arrow 51 to the broken line position pivots the cutter bar 24 to the chain operative position to release the brake band and enable chain travel. When the chain saw is in use and the lever 50 is not gripped by the operator the forward abutment 52 is positioned so that upon a kick-back the operator can hit the lever to assist the spring in quickly urging the cutter bar 24 to the safety position to tighten the brake band on the clutch drum and to stop chain movement.

The chain saw shown in FIG. 3 includes a cutter bar 60 which is pivoted to the frame 12 by bolt 63. The cutter bar is also connected to the frame 12 by a toggle linkage 54 composed of links 60, 62 which are commonly connected at 64. Link 60 is pivoted to the frame by a pin 66 and link 62 is connected to the cutter bar by pivot 65. The linkage 54 is biased and urged to the brake on position shown in full lines by spring loaded rod 70 which is connected to the toggle pivot 64. A spring 71 is connected between an apertured bracket 72 on the frame and a cross pin 74 on the rod 70. A brake actuation lever 76 is pivotally connected to the frame 12 by a pin 78 and connected to the rod 70 by a pin 80. The spring 71 biases the linkage 54 to the on center position shown in full lines with the brake engaged. The brake actuator lever 72 can be moved rearwardly in the direction of arrow 84 by the saw operator to break the toggle from the on center position and to allow the cutter bar 24 to pivot to the brake off position.

The toggle linkage shown in FIG. 3 provides a mechanical advantage to assist the spring in urging the cutter bar to the safety position.

FIG. 4 shows a modified embodiment in which the chain saw bar pivot comprises a torsion bar 90 which has an end 92 pinned to the frame 12 by a pin 94. The torsion bar 92 is supported in an aperture 96 in frame portion 98. The torsion bar 90 has a square end 100 which interfits in a square opening 102 in the cutter bar. The cutter bar 106 can be provided with a guide slot and pin 31 as described for the FIG. 1 embodiment. The torsion bar is pre-loaded during assembly to bias the cutter bar to the brake on position. Pressure of the cutter bar against the work will overcome the torque and permit displacement of the cutter bar to release the brake.

I claim:

1. A chain saw including a frame, a motor with an output shaft, a cutting chain, a cutter bar for guiding said chain, a sprocket on said output shaft for driving said cutting chain, pivot means for pivotally mounting said cutter bar to said frame to afford movement between a forward safety position and a rearwardly displaced cutting position, means for biasing said cutting bar to said forward safety position, and said cutter bar being displaceable to said cutting position to overcome the bias of said biasing means and about said pivot means when said cutter bar is pressed against work material for cutting action, brake means associated with said sprocket for stopping movement of said sprocket and said cutting chain, means connecting said brake means to said cutter bar to actuate said brake means to stop chain movement when said cutter bar is pivoted to said safety position by said biasing means upon release of said cutter bar from the work material and said brake means being released upon rearward pivotal movement of said cutter bar to said cutting position as said cutter bar is pressed against the work.

2. A chain saw in accordance with claim 1 wherein said saw includes a centrifugal clutch having a drum connected to said output shaft and a hub connected to said sprocket, and said brake means comprising a brake band arranged around said drum and connected between said frame and said cutter bar so that said brake band is tensioned about said drum and stops movement of said sprocket when said cutter bar is in the safety position and is released from a braking condition on said drum when said cutter bar is in the cutting position.

3. A chain saw including a frame, a motor with an output shaft, a cutting chain, a cutter bar for guiding said cutting chain, a sprocket on said output shaft for driving said cutting chain, pivot means for pivotally mounting said cutter bar to said frame to afford movement between a forward safety position and a rearwardly displaced cutting position, means for biasing said cutting bar to said forward safety position, and said cutter bar being displaceable to said cutting position to overcome the bias of said biasing means and about said pivot means when said cutter bar is pressed against work material for cutting action, brake means associated with said sprocket for stopping movement of said sprocket and said cutting chain, means connecting said brake means to said cutter bar to actuate said brake means to stop chain movement when said cutter bar is pivoted to said safety position by said biasing means upon release of said cutter bar from the work material and said brake means being released upon rearward pivotal movement of said cutter bar to said cutting position as said cutter bar is pressed against the work and including manually operable means connected to said cutter bar for overcoming the bias of said biasing means to release said brake means to move said cutter bar to said cutting position without pressure of said cutter bar against the work material.

4. A chain saw in accordance with claim 3 wherein said manually operable means comprises a lever pivotally supported on said frame, a projection on said cutter bar engageable with said lever, and said lever being manually movable against said projection to move said cutter bar against the bias of said biasing means about said cutter bar pivot to the cutting position.

5. A chain saw in accordance with claim 3 in which said manually operable means includes first and second commonly connected links with said first link connected to said frame and said second link connected to said cutter bar and biasing means connected to said linkage to urge said linkage into an on center position with said cutter bar in a safety position and manually operable lever means connected to said linkage to collapse said linkage to move said cutter bar to the cutting position.

6. A chain saw in accordance with claim 1 wherein said pivot means for said cutter bar and said biasing means comprises a torsion bar having one end connected to the frame and another end connected to said cutter bar with said torsion bar loaded to bias said cutter bar to the forward safety position.

7. A chain saw including a frame, a motor with an output shaft, a cutting chain, a cutter bar for guiding said cutting chain, a sprocket on said output shaft for driving said cutting chain, said sprocket having an associated hub, pivot means for pivotally mounting said cutter bar to said frame about a pivotal axis offset from said output shaft to afford movement of said cutter bar relative to said sprocket between a forward safety position and a rearwardly displaced cutting position, stop means on said frame and said cutter bar to limit movement of said bar between said safety position and said cutting position, means for biasing said cutting bar to said forward safety position, and said cutter bar being displaceable to said cutting position to overcome the bias of said biasing means and about said pivot means when said cutter bar is pressed against work material for cutting action, brake means associated with said sprocket hub for stopping movement of said sprocket and said cutting chain, means connecting said brake means to said cutter bar to actuate said brake means to grip said hub to stop chain movement when said cutter bar is pivoted to said safety position by said biasing means upon release of said cutter bar from the work material and said brake means being released upon rearward pivotal movement of said cutter bar to said cutting position as said cutter bar is pressed against the work.

8. A chain saw in accordance with claim 7 including manually operable means connected to said cutter bar to enable pivotal movement of said bar about said pivot means for overcoming the bias of said biasing means and to release said brake means to move said cutter bar to said cutting position without pressure of said cutter bar against work material.

9. A chain saw in accordance with claim 7 wherein said brake means comprises a brake band having one end connected to said cutter bar and the other end connected to said frame, with said band arranged around said hub so that said band grips said hub to stop chain movement when said cutter bar is displaced about said pivot means to said forward safety position by said biasing means and the grip of the band on said hub is released when said cutter bar is displaced to the cutting position.

10. A chain saw in accordance with claim 7 wherein said pivot means for said cutter bar and said biasing means comprises a torsion bar having one end connected to the frame and another end connected to said cutter bar, with said torsion bar loaded to bias said cutter bar to the forward safety position.

* * * * *